United States Patent
Addington et al.

(10) Patent No.: US 7,246,366 B1
(45) Date of Patent: Jul. 17, 2007

(54) SYSTEM AND METHOD FOR AUTOMATICALLY DETERMINING SERVICE GROUPS IN A SUBSCRIBER NETWORK

(75) Inventors: Timothy H. Addington, Roswell, GA (US); Gerald F. O'Carroll, Jr., Snellville, GA (US); Randolph R. Beebe, Duluth, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 1138 days.

(21) Appl. No.: 09/592,405

(22) Filed: Jun. 13, 2000

(51) Int. Cl.
*H04N 7/173* (2006.01)

(52) U.S. Cl. .................... 725/93; 725/50; 725/97; 725/114; 725/116; 725/140

(58) Field of Classification Search .............. 725/2, 725/38–40, 44–49, 68, 85, 100, 111, 120, 725/131, 139, 151, 89–93, 97, 112–117, 50, 725/132, 138, 144; 348/732; 455/186.1–2, 455/161.2, 168.1, 6.2, 410, 456.1–456.6
See application file for complete search history.

(56) References Cited

U.S. PATENT DOCUMENTS

| | | | |
|---|---|---|---|
| 4,860,379 A | | 8/1989 | Schoeneberger et al. ....... 455/5 |
| 5,255,086 A | | 10/1993 | McMullan, Jr. et al. ....... 358/86 |
| 5,805,230 A | * | 9/1998 | Staron ........................ 348/460 |
| 5,838,383 A | * | 11/1998 | Chimoto et al. ............. 348/553 |
| 5,940,509 A | * | 8/1999 | Jovanovich et al. .......... 713/191 |
| 5,953,051 A | | 9/1999 | Fielding et al. ............... 348/15 |
| 5,953,506 A | * | 9/1999 | Kalra et al. ................. 709/231 |
| 6,035,339 A | * | 3/2000 | Agraharam et al. ......... 709/246 |
| 6,167,441 A | * | 12/2000 | Himmel ....................... 709/217 |
| 6,172,674 B1 | * | 1/2001 | Etheredge ................... 345/721 |
| 6,177,931 B1 | * | 1/2001 | Alexander et al. ............. 725/52 |
| 6,289,358 B1 | * | 9/2001 | Mattis et al. ................ 707/203 |
| 6,340,997 B1 | * | 1/2002 | Borseth ....................... 348/731 |
| 6,366,326 B1 | * | 4/2002 | Ozkan et al. ................ 348/558 |
| 6,401,242 B1 | * | 6/2002 | Eyer et al. ..................... 725/35 |
| 6,415,437 B1 | * | 7/2002 | Ludvig et al. ................. 725/41 |
| 6,421,726 B1 | * | 7/2002 | Kenner et al. ............... 709/225 |
| 6,484,029 B2 | * | 11/2002 | Hughes et al. ............... 455/434 |
| 6,513,112 B1 | * | 1/2003 | Craig et al. ..................... 713/1 |
| 6,594,699 B1 | * | 7/2003 | Sahai et al. .................. 709/228 |
| 6,622,303 B1 | * | 9/2003 | Yamashita .................... 725/66 |
| 6,647,389 B1 | * | 11/2003 | Fitch et al. ................... 707/10 |
| 6,704,930 B1 | * | 3/2004 | Eldering et al. .............. 725/36 |
| 6,718,374 B1 | * | 4/2004 | Del Sordo et al. .......... 709/220 |
| 6,734,804 B1 | * | 5/2004 | Lee ........................ 340/825.72 |

(Continued)

FOREIGN PATENT DOCUMENTS

EP 0725549 8/1996

Primary Examiner—Annan Q. Shang (57) ABSTRACT

A decoder checks a table within its received input signal and tunes to at least one of the listed frequencies to determine its associated service group within a subscriber television system. The associated service group associates the decoder with the modulators, transport streams, and other components providing services and programming to that particular decoder. The decoder transmits its associated service group to the subscriber television system headend. The subscriber television system then knows the services and programming available on that particular decoder. The decoder can periodically verify its associated service group and, if the service group is changed, notify the headend. By establishing decoders for auditing the system, the definition of the service groups can be established or updated when components or configurations are introduced or changed.

17 Claims, 9 Drawing Sheets

U.S. PATENT DOCUMENTS 6,757,912 B1 * 6/2004 Vaughan et al. ............ 725/139
7,042,526 B1 * 5/2006 Borseth ...................... 348/731
2002/0027562 A1 * 3/2002 Kimble et al. .............. 345/629

* cited by examiner

SERVICE GROUP MAP TABLE_600

Table with column markers 602, 604, 606, 608

| TSId | SGId | transmission_ system | inner_ coding_ mode | split_ bitstream_ mode | modulation_ format | symbol_ rate | frequency |
|---|---|---|---|---|---|---|---|
| | mapVersion = 126 |||||||
| | mapEntries = 14 |||||||
| 0x0031 | 0x0100 | 2 (ITU-B) | 7 (rate 3/4 coding) | 0 (no) | 8 (QAM 64) | 27000000 (27 Msym/sec) | 506 MHz |
| 0x0032 | 0x0100 | 2 | 7 | 0 | 8 (QAM 64) | 27000000 | 512 MHz |
| 0x0033 | 0x0100 | 2 | 7 | 0 | 8 (QAM 64) | 27000000 | 518 MHz |
| 0x0034 | 0x0100 | 2 | 7 | 0 | 8 (QAM 64) | 27000000 | 524 MHz |
| 0x1001 | 0x0100 | 2 | 7 | 0 | 8 (QAM 64) | 27000000 | 752 MHz |
| 0x0531 | 0x0200 | 2 (ITU-B) | 7 (rate 3/4 coding) | 0 (no) | 8 (QAM 64) | 27000000 (27 Msym/sec) | 506 MHz |
| 0x0532 | 0x0200 | 2 | 7 | 0 | 8 (QAM 64) | 27000000 | 512 MHz |
| 0x0533 | 0x0200 | 2 | 7 | 0 | 8 (QAM 64) | 27000000 | 518 MHz |
| 0x0534 | 0x0200 | 2 | 7 | 0 | 8 (QAM 64) | 27000000 | 524 MHz |
| 0x1501 | 0x0200 | 2 | 7 | 0 | 16 (QAM 256) | 38000000 (38 Msym/sec) | 752 MHz |
| 0x2000 | 0x1000 | 2 | 7 | 0 | 16 (QAM 256) | 38000000 | 764 MHz |
| 0x2001 | 0x1000 | 2 | 7 | 0 | 16 (QAM 256) | 38000000 | 770 MHz |
| 0x2002 | 0x1000 | 2 | 7 | 0 | 16 (QAM 256) | 38000000 | 776 MHz |
| 0x2003 | 0x1000 | 2 | 7 | 0 | 16 (QAM 256) | 38000000 | 782 MHz |

MODULATOR TUNING TABLE 800

SYSTEM AND METHOD FOR AUTOMATICALLY DETERMINING SERVICE GROUPS IN A SUBSCRIBER NETWORK

FIELD OF THE INVENTION

This present invention relates to determining the service group associated with the various components in a subscriber television system and, more specifically, to automatically determining the services and programming available on a particular home communication terminal.

BACKGROUND OF THE INVENTION

In a subscriber television system, television services have traditionally included little more than an analog broadcast video source. Recently, however, digital programming has become a reality and the digital home communication terminal ("HCT"), otherwise known as the set-top box, has become a powerful computing device for accessing video services and allowing a user to navigate through the maze of available services. In addition to supporting traditional analog broadcast video and functionality, HCTs now also support an increasing number of services that are digital. These services include two-way interactive services such as video-on-demand, e-mail, and web browsers. These are all in addition to the host of other television services that are increasingly available to subscribers, examples of which include audio and audio/visual programming, advanced navigation controls, impulse pay-per-view technology, and online commerce to name but a few. In the digital world, there is a dramatic increase in the number of services that are available to subscribers.

With the increase in two-way interactive services, identifying an individual HCT becomes an important function for the subscriber television system. Messages, data, programming, and other information need to be identified as coming from and as being correctly sent to a desired HCT. With the concerns over privacy, improper identification or sending a message to the wrong HCT could lead to a lawsuit or the loss of business opportunities.

In addition, in any subscriber television system there is a limited amount of bandwidth available and therefore a limited number of transmission frequencies that can be delivered to a particular HCT. In a typical subscriber television environment, this limitation determines the number of services that system operators may offer to their subscribers.

One class of services envisioned for the subscriber television system employs a high-speed connection from the headend to the HCT. This connection allocates an exclusive portion of the bandwidth to the subscriber of that service. This type of service is used to support applications such as Video on Demand (VOD) where the connection is used to transport an MPEG-2 (Motion Picture Experts Group second standard) stream to the HCT under control of the subscriber. The bandwidth used by this service is dedicated exclusively to that HCT for the time that the service is being used.

Since there is a limited amount of bandwidth available in the subscriber television system, the system can not support a sufficient number of these exclusive services if the entire bandwidth is available to every HCT. The more advanced system designs allow different services and programming to be available to different locations within the system. This allows different exclusive services to use the same portion of the spectrum in different parts of the system. At the same time, services that are common to all HCTs may be delivered throughout the network.

This system design provides the system operator a large degree of flexibility in designing a system that will deliver a mix of services that satisfy their marketing requirements. With this flexibility however, comes complexity. Because the system may be changed over time to support a different mix of services, it becomes very difficult to keep up with which services are available to a given HCT at any given time. With traditional analog broadcast services, the subscriber television system typically had one headend with a main transmission trunk and smaller transmission branches distributing the programming to the service coverage areas and the individual settops. The programming on the analog system was typically one-way and uniform (i.e., the same programming) to each subscriber. Newer subscriber television systems can include combinations of multiple headends, mini-headends, hubs, and nodes. The new system structures allow two-way communications and the introduction of different services and programming to different areas within a subscriber television system. Subscribers living in adjacent subdivisions may have different programs on channel 7 of their respective HCTs. One subscriber may have access to video-on-demand (VOD) services while his neighbor may not. The control mechanism for the entire subscriber television system needs to know which programming and which services are available to which HCT. In the case of advanced system architecture, the subscriber television system has to determine how to route a service to a particular HCT. In order to make this decision, the system controller needs to know the services available on every HCT.

Thus, there is a need for an efficient method, apparatus, and system that will allow the easy and dynamic identification of the services and programming available to an HCT in a subscriber television system.

BRIEF DESCRIPTION OF THE DRAWINGS

While the specification concludes with claims defining the features of the invention that are regarded as novel, it is believed that the invention will be better understood from a consideration of the following description in conjunction with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Introducing additional services and programming at multiple hubs or nodes increases the complexity of a subscriber television system. With the complexity and the constant modification and expansion of a subscriber television system, service groups provide a useful and adaptable tool to establish and maintain the organization and relationships of equipment and HCTs within the subscriber television system. A service group defines the services and programming available from the subscriber television equipment associated with the service group to the HCTs in the service group. A subscriber television system headend can communicate with a particular HCT based on the modulators and other equipment defined by a service group associated with that HCT. The headend can identify the services and programming available on that particular HCT based on the service group. One aspect of the present invention is the use of a service group audit to define and update the service groups of the digital subscriber television system. In another aspect of the present invention, an HCT determines and informs the subscriber television system of the service group that it belongs to.

The present invention is directed to a method and apparatus to define service groups using a service group audit. The service group audit determines the equipment and thus the services and programming that will comprise a service group. A service group audit identifies the group of modulators that provide the programming and services to a particular portion of the subscriber television system. Service groups associate modulator groups with the multiple distribution levels for the variety of services and programming within the subscriber television system.

In addition, the present invention is directed to a method, apparatus, and system that allows the easy and dynamic identification of a service group associated with an HCT in a subscriber television system. A service group allows the easy identification of the services and programming available on a particular HCT.

The present invention is best understood within the context of a two-way, interactive digital subscriber television system. An overview of a subscriber television system illustrates the various service distribution levels within the subscriber television system and includes an overview of the subscriber television system network and more detailed illustrations of a headend and a node.

In this discussion, the two-way, interactive digital subscriber television system is also referred to as a Digital Broadband Delivery System (DBDS). An overview of an exemplary DBDS is provided in U.S. patent application Ser. No. 09/126,921, entitled "Conditional Access System", filed 31 Jul. 1998, which is incorporated herein by reference. The function of the DBDS is to provide interfaces to content providers and services, control access to and the use of the content and services, and to distribute the content and services to subscribers. The DBDS uses Motion Picture Experts Group (MPEG) transport streams for delivery of video, audio, and data entertainment services. These can include programming and services such as local television channels, premium movie channels, video-on-demand (VOD), telephone services, and Internet access.

Figure 1:
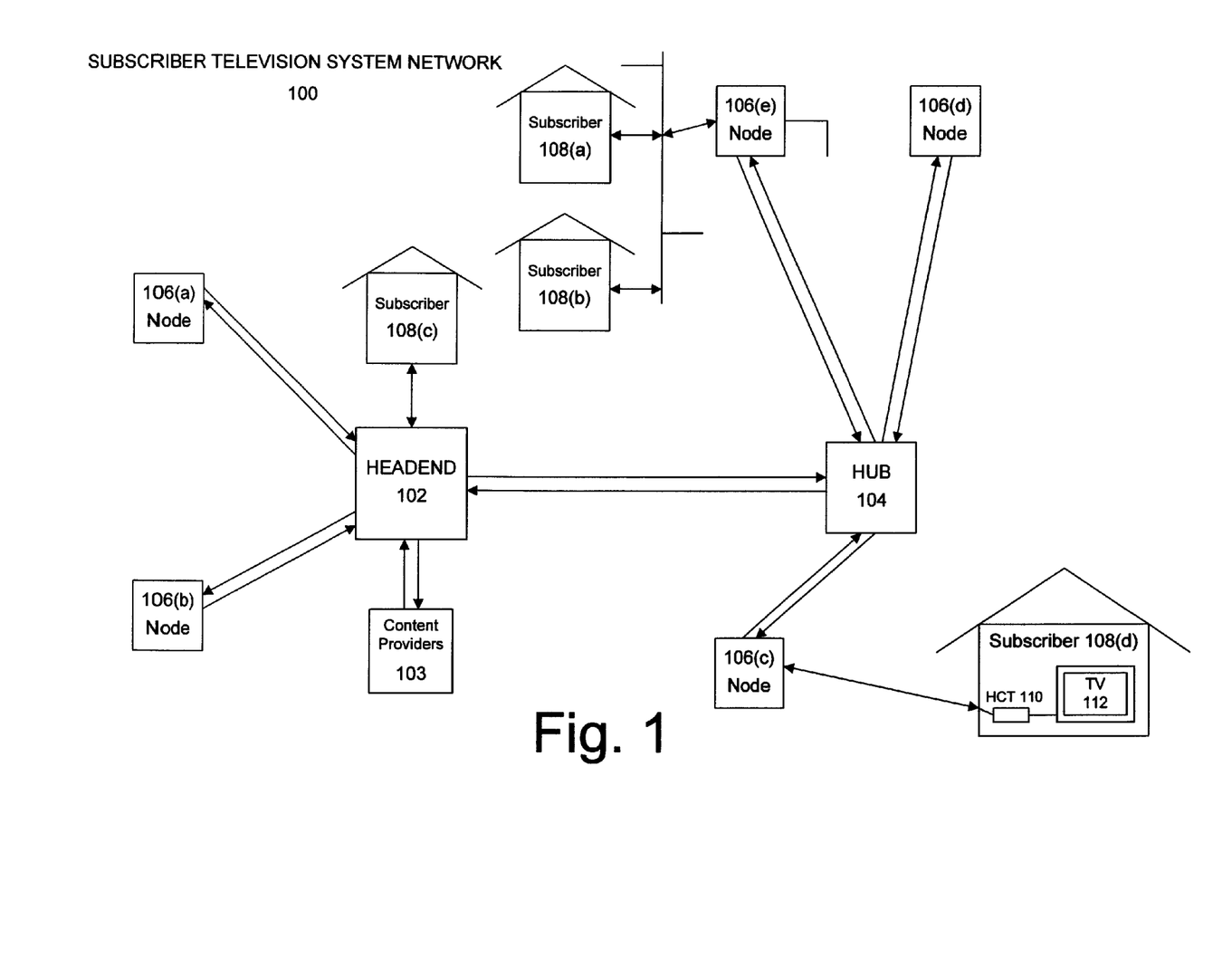
FIG. 1 is a diagram of a two-way, interactive digital subscriber television system network.

FIG. 1 is an overview of a two-way, interactive digital subscriber television system network 100. The subscriber television system network 100 includes a headend 102, a hub 104, multiple nodes 106, a plurality of subscriber locations 108, and a plurality of HCTs 110.

The headend 102 provides the interface between the subscriber television system network 100 and the service and content providers 103, such as broadcasters, internet service providers, and the like. The transmission medium between the headend 102 and the service and content providers 103 can be two-way. This allows for two-way interactive services such as Internet access via subscriber television system network 100.

Unlike the transmission medium of prior systems, which have a main trunk and branches, the DBDS can run multiple trunks to multiple hubs 104 or nodes 106. Typically this allows the use of a fiber optical cable to distribute high quality signals to a sub-region of the network 100 associated with a hub 104 or a node 106. The subscriber television system network 100 can use broadband coaxial cable to distribute the signal within the sub-region. The headend 102 can provide service to its immediate sub-region, such as subscriber location 108(*c*). For example, services and programming for the subscriber location 108(*c*) is sent directly to the subscriber location 108(*c*) from the headend 102. The hub 104 or node 106 can function as a mini-headend for the introduction of programming and services to each sub-region. This allows the introduction of different services and programming to different sub-regions within the subscriber television system. For example, the subscriber location 108(*b*) can have different services and programming available than the services and programming available to subscriber location 108(*c*), even though they may be in close physical proximity to each other. Services and programming for subscriber location 108(*b*) are routed through hub 104 and node 106(*e*). Subscriber location 108(*b*) could have different services and programming introduced in hub 104 or node 106(*e*).

The programming and services are delivered via the subscriber television system network 100 to subscriber locations 108. At the subscriber locations 108 a decoder 110, such as a home communications terminal (HCT), provides the two-way interface between the subscriber television system network 100 and the subscriber. The HCT decodes the signals for display on a display device, such as a television set (TV) 112 or a computer monitor. Those skilled in the art will appreciate that in alternative embodiments the equipment for decoding the signal can be located in a variety of equipment, including an HCT, a computer, a TV, or a monitor.

Figure 2:
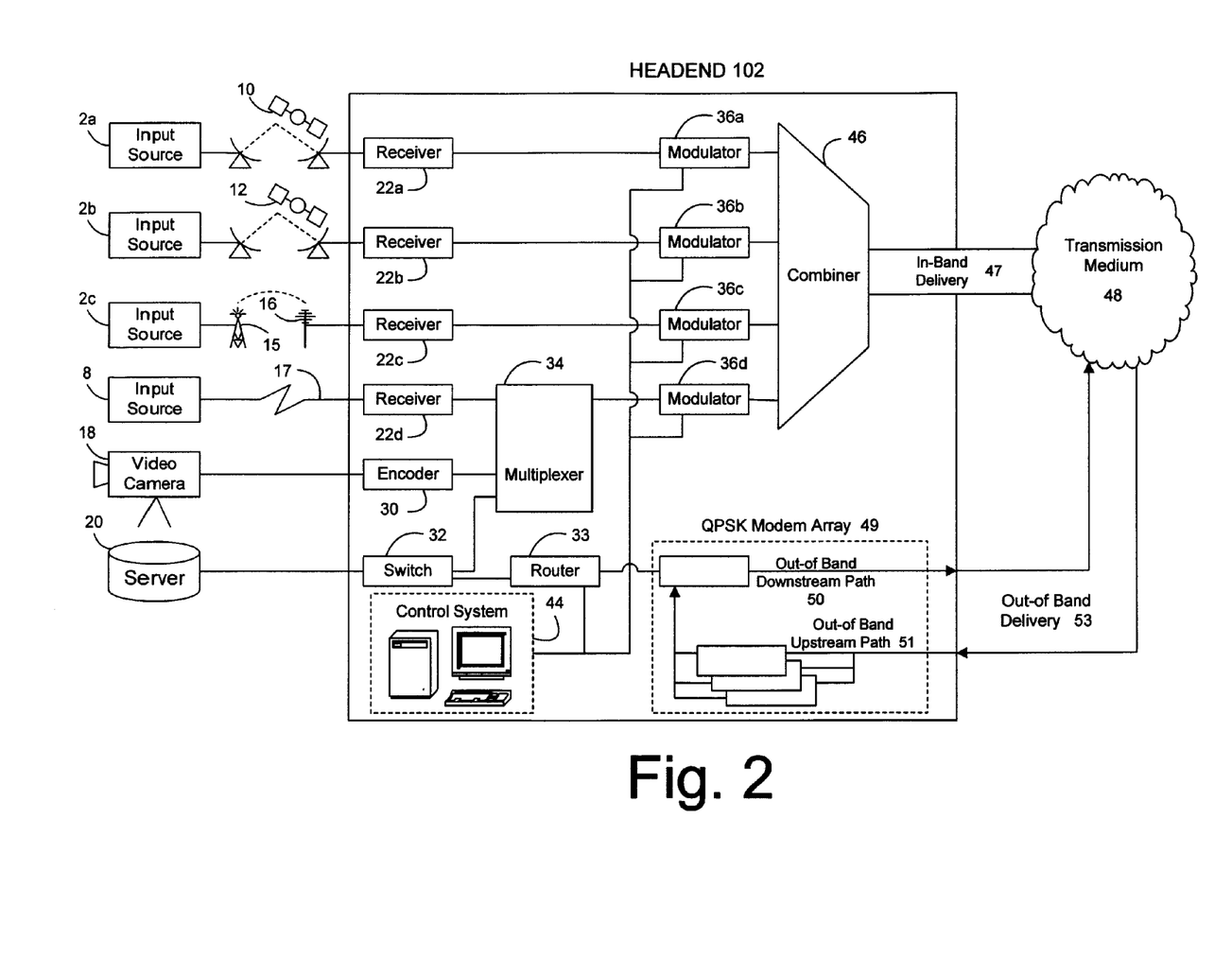
FIG. 2 is a block diagram of a subscriber television system headend, which forms a part of the television system of FIG. 1.

FIG. 2 is an overview of a subscriber television system headend 102. The headend 102 provides the interface between the subscriber television system network 100 and the service and content providers 103 (shown in FIG. 1). The headend 102 receives content from a variety of service and content providers 103, which can provide input in a variety of ways. The headend 102 combines the content from the various sources and distributes the content to subscribers via transmission medium 48.

In a typical system, the headend 102 receives content from a variety of sources 2*a*, 2*b*, 2*c*. The input signals may be transmitted from the source to the headend via a variety of transmission paths, including satellite 10, 12, and terrestrial broadcast 15, 16. The headend can also receive content from a direct feed source 8 via a direct line 17. Other input sources include a video camera 18 or an application server 20. The signals provided by the content or programming input sources can include a single program or a multiplex that includes several programs.

The headend 102 includes a plurality of receivers 22*a*, 22*b*, 22*c*, 22*d* that are each associated with a content source. MPEG encoders, such as encoder 30, are included for encoding such things as local programming or a video camera 18 feed. Some of the signals may require additional processing, such as signal multiplexing prior to being modulated. Such multiplexing is done by multiplexer 34.

A switch, such as ATM switch 32, provides an interface to an application server 20. There can be multiple application servers 20 providing a variety of services such as a Pay-Per-View service, a data service, an Internet service, a network system, or a telephone system. Service and content providers 103 (shown in FIG. 1) may download content to an application server 20 located within the subscriber television system. The application server 20 may be located within headend 102 or elsewhere within subscriber television system network 100, such as in a node 106 or a hub 104.

The various inputs into the headend 102 are then combined with the other information specific to the subscriber television system, such as local programming and control information. The headend 102 contains a plurality of modulators, 36*a*, 36*b*, 36*c*, and 36*d*, to convert the received programming information into a modulated output signal suitable for transmission over the transmission medium 48. The modulators 36, such as Quadrature Amplitude Modulation (QAM) modulators, prepare the MPEG formatted information for delivery as the in-band data 47 via the transmission medium 48 to the subscriber locations 108 (shown in FIG. 1). The output signals from the modulators 36 are combined, using equipment such as a combiner 46, for input into the transmission medium 48 via the in-band delivery path 47.

In the DBDS, video, audio, and control information are encoded as MPEG program streams, which are then multiplexed to form MPEG transport streams. Each MPEG transport stream is assigned to a QAM modulator 36 and modulated to a set frequency. For the HCT 110 (shown in FIG. 1) to receive a television program, the HCT 110 must tune to the frequency associated with the MPEG transport stream that contains the desired information, de-multiplex the MPEG transport stream, and decode the appropriate MPEG program streams.

A system controller, such as control system 44, allows the television system operator to control and monitor the functions and performance of the subscriber television system. The control system 44 interfaces with various components in order to monitor and/or control a variety of functions, including the channel lineup for the subscriber television system, billing for each subscriber, and conditional access for the content distributed to subscribers. Control system 44 provides input to the modulators 36 for setting their operating parameters, such as system specific MPEG table packet organization or conditional access information. Control information and other data can be communicated via an in-band delivery path 47 or via an out-of-band delivery path 53. The out-of-band data is transmitted via the out-of-band downstream path 50 of transmission medium 48 by a Quadrature Phase-Shift Keying (QPSK) modem array 49. Two-way communication utilizes the upstream portion of the out-of-band delivery system. Out-of-band data from the transmission medium 48 is received in headend 102 via out-of-band upstream paths 51. The out-of-band data is routed through router 33 to an application server 20 or to control system 44. The out-of-band control information includes such information as a pay-per-view purchase instruction and a pause viewing command from the subscriber location 108 (shown in FIG. 1) to a video-on-demand type application server 20.

A control system 44, such as Scientific-Atlanta's Digital Network Control System (DNCS), also monitors, controls, and coordinates all communications in the subscriber television system, including video, audio, and data. The control system 44 can be located at headend 102 or remotely.

The transmission medium 48 distributes signals from the headend 21 to the other elements in the subscriber television system, such as a hub 104, a node 106, and subscriber locations 108 (shown in FIG. 1). The transmission medium 48 can incorporate one or more of a variety of media, such as optical fiber, coaxial cable, hybrid fiber-coax (HFC), satellite, direct broadcast, or other transmission media.

Figure 3:
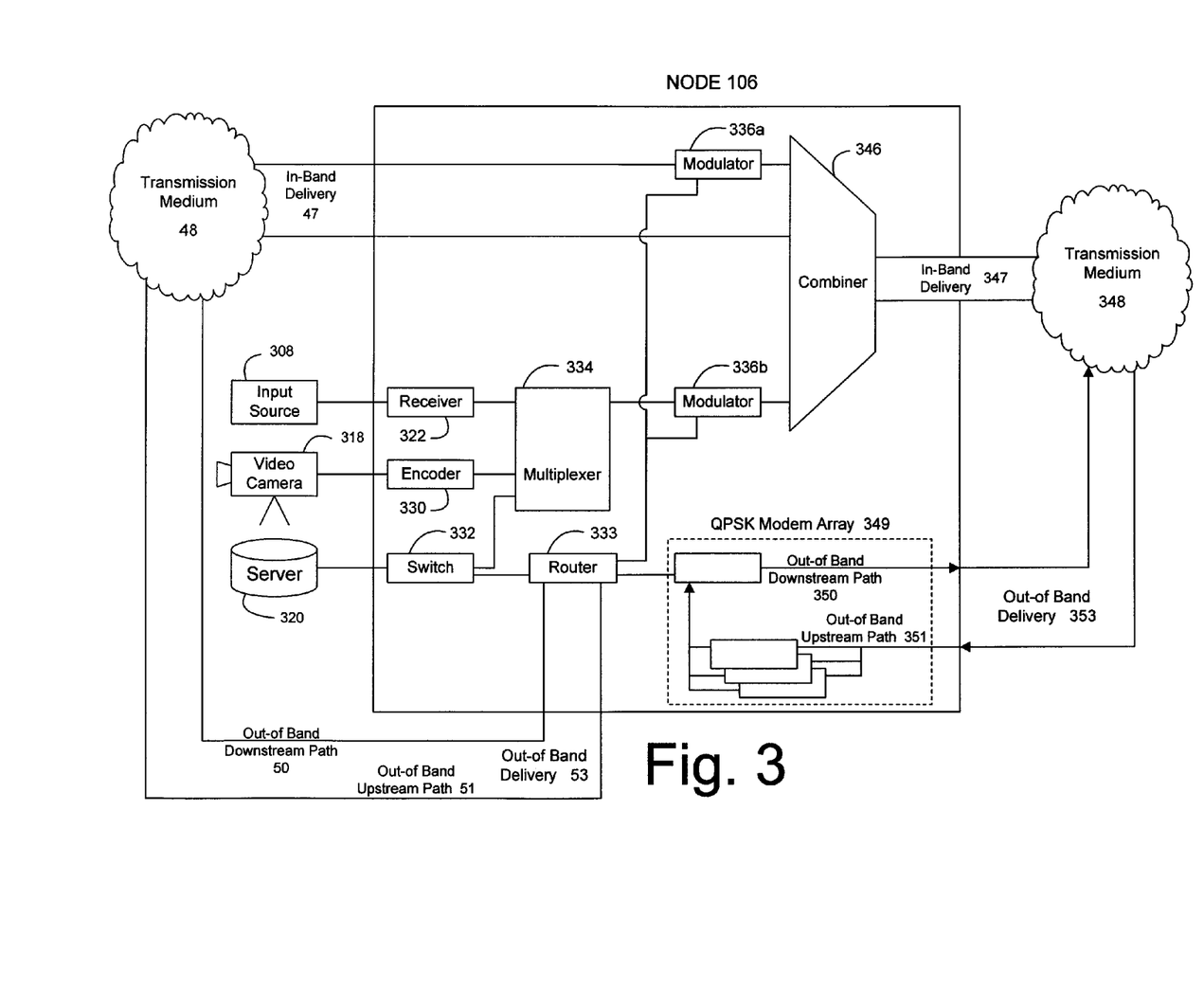
FIG. 3 is a block diagram of a subscriber television system node, which forms a part of the television system of FIG. 1.

FIG. 3 is an overview of subscriber television system node 106. The node 106 provides services and programming to the HCTs in a sub-region of the subscriber television system. Node 106 receives programming, services, and data from the headend 102 via the in-band delivery path 47 and the out-of-band delivery path 53 of transmission medium 48. In addition, the node 106 can receive or provide services and programming from an additional input source 308, a video camera 318, or a sub-region application server 320.

The node 106 functions as a mini-headend and includes many of the same elements as the headend 102. The node 106 includes a receiver 322 that is associated with input source 308. MPEG encoders, such as encoder 330, are included for encoding such things as local programming or a video camera 318 feed. Some of the signals may require additional processing, such as signal multiplexing prior to being modulated. Such multiplexing is done by multiplexer 334.

A switch, such as ATM switch 332, provides access to the sub-region application server 320. There can be multiple sub-region application servers 320 providing a variety of services such as a Pay-Per-View service, a data service, an Internet service, a network system, or a telephone system. Service and content providers 103 (shown in FIG. 1) may download content to a sub-region application server 320 via transmission medium 48. The services and programming of the sub-region associated with a node 106 may be orientated to the demographics of the sub-region. This sub-region segmentation of the subscriber television system allows for very localized services and programming such as a neighborhood channel or direct advertising to a specific market segment.

The services and programming for the sub-region are then combined with the other information specific to the subscriber television system, such as services and programming from headend 102. The node 106 contains a plurality of modulators, 336*a* and 336*b*, to convert the programming information into a modulated output signal suitable for transmission over the transmission medium 348. The modulators 336 convert the received programming information into a modulated output signal suitable for transmission over the transmission medium 348. The modulators 336, such as Quadrature Amplitude Modulation (QAM) modulators, prepare the MPEG formatted information for delivery via the in-band delivery path 347 of the transmission medium 348 to the subscriber locations 108 (shown in FIG. 1). The output signals from the modulators 336 are combined, using equipment such as a combiner 346, for input into the transmission medium 348 via the in-band delivery path 347.

Out-of-band data is transmitted to the transmission medium 348 by the Quadrature Phase-Shift Keying (QPSK) modem array 349 via out-of-band downstream path 350. Two-way communication utilizes the upstream portion of the out-of-band delivery path 353. Out-of-band data from the transmission medium 348 is received in the QPSK modem array 349 of node 106 via out-of-band upstream paths 351 of transmission medium 348. The out-of-band information is routed through router 333 to headend 102 and application servers 320. Router 333 provides the interface between node 106 and headend 102 for out-of-band control information. The out-of-band data is routed to the router 333. Router 333 provides the link between headend 102 and the HCTs in the sub-region for out-of-band data.

The transmission medium 348 distributes signals from the node 106 to subscriber locations 108 (shown in FIG. 1) in the sub-region associated with node 106. The transmission medium 348 can incorporate one or more of a variety of media, such as optical fiber, coaxial cable, hybrid fiber-coax, satellite, direct broadcast, or other transmission media. An example of a subscriber television system incorporating multiple varieties of media would be the transmission media referred to as hybrid fiber-coax that includes a transmission medium 48 incorporating fiber-optical cabling and a transmission medium 348 incorporating coaxial cabling.

With multiple places to introduce services and programming, the control system 44 (shown in FIG. 1) for the subscriber television system must coordinate and control the services and programming available to each HCT. A service group defines a group of HCTs that receive services and programming from the same modulators. Therefor all the HCTs in a service group have available to them the same services and programming, even if some subscribers do not subscribe to the same services and programming. In this context, the present invention allows for the easy identification of the service groups and the services and programming available to an HCT within a subscriber television system.

Figure 4:
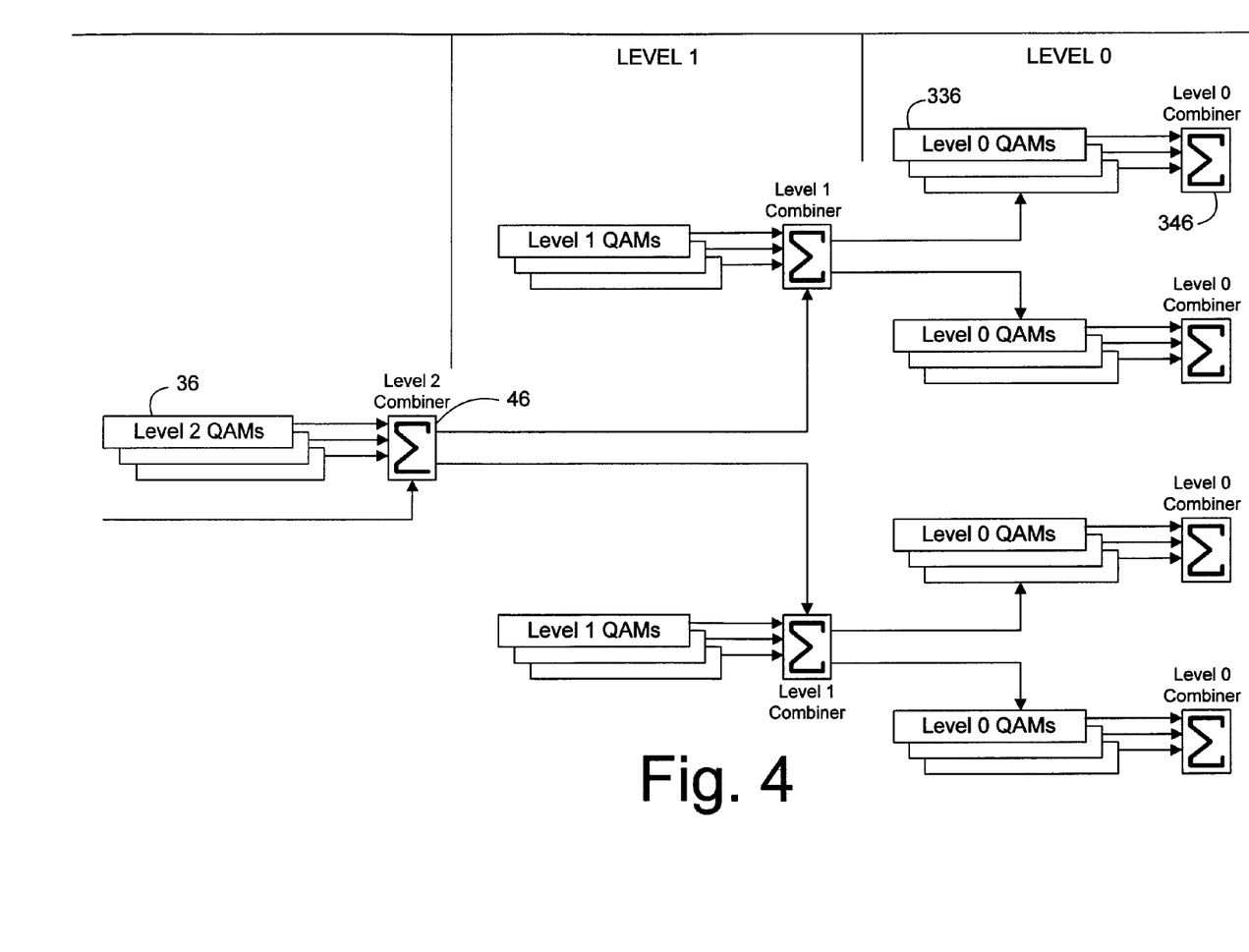
FIG. 4 is a diagram illustrating different service group levels within a subscriber television system.

FIG. 4 is an overview of different service group levels within a subscriber television system. Service group levels are associated with places within a subscriber television system that additional services or programming can be introduced. In an exemplary embodiment of the present invention, the lowest service group level (i.e., Level 0) is assigned to the place in the distribution system where additional services and programming can be introduced furthest from the headend 102. For example, the nodes 106 (shown in FIG. 1) could be assigned level 0. The QAM modulators 336 and the combiner 346 in the various nodes would be assigned to service group level 0. The QAM modulators and combiner in the hub 104 (shown in FIG. 1) would be assigned to service group level 1. The QAM modulators and combiner 46 in the headend 102 (shown in FIG. 1) would be assigned to service group level 2. If needed, additional levels can be defined to support more complicated networks or additional sub-regions within the subscriber television system.

Figure 5:
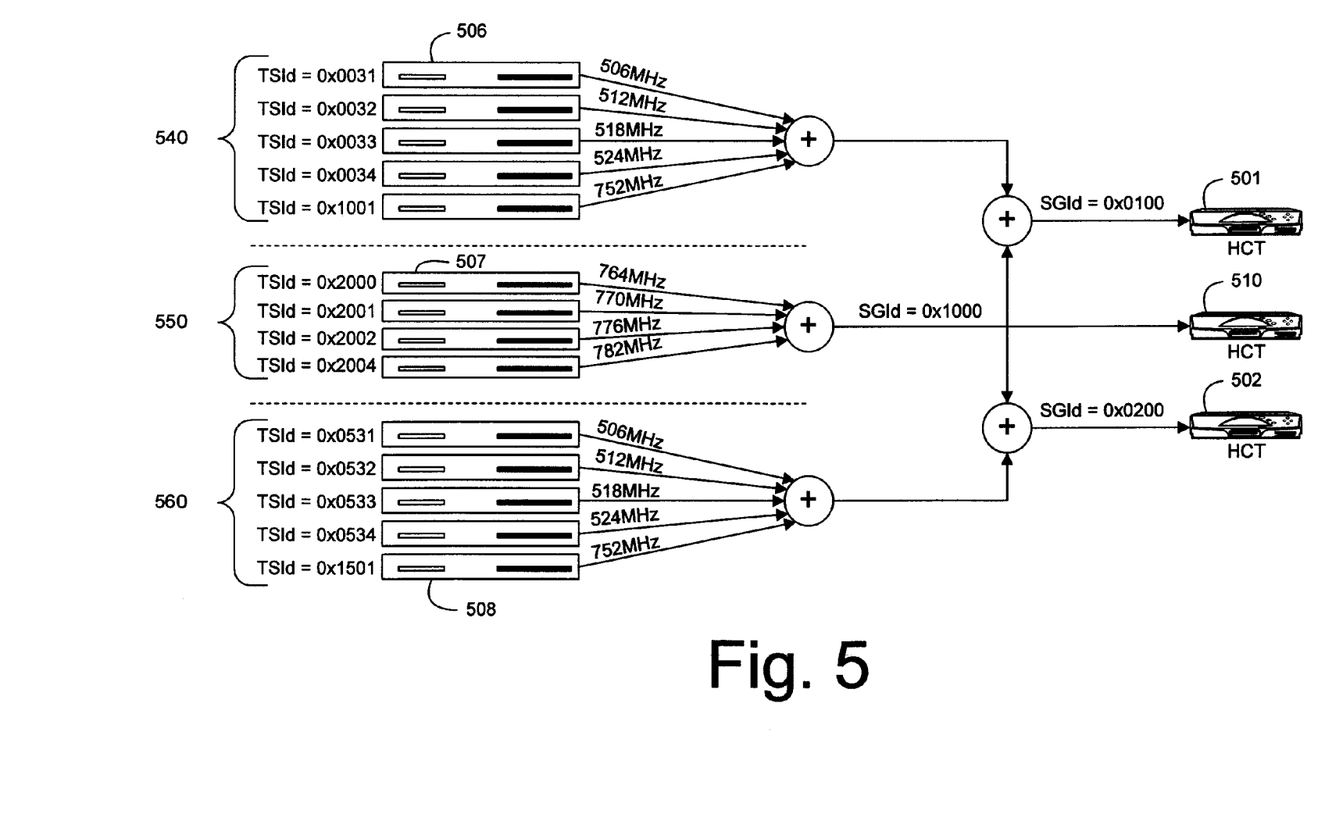
FIG. 5 is a diagram illustrating the association of transport stream identification with service groups.

FIG. 5 illustrates the way transport streams are associated with service groups. In an MPEG system, the services and programming are transmitted in transport streams. Each transport stream has a transport stream ID (TSID) that is unique within the subscriber television system. There is one TSID assigned to each transport stream that a modulator generates. In the case of a multiple stream modulator, each of the transport streams generated by that device is assigned a unique TSID. In an exemplary embodiment, the system controller assigns a TSID to a transport stream of a modulator. The modulator inserts the TSID into the MPEG Program Association Table (PAT) of its output transport stream. An application, executing on an HCT downstream in the subscriber television system from the modulator, would access the PAT and retrieve the TSID to identify the received transport stream. Typically, there is a modulator associated with each TSID. For example, in FIG. 5 modulator 506 is associated with TSID=0x0031. A modulator modulates the output signal containing the transport stream to a set frequency. For example, modulator 506 modulates the transport stream with TSID=0x0031 to the frequency of 506 MHz. An HCT will tune to the frequency corresponding to a modulator in order to receive the transport stream associated with that modulator. For an HCT to receive the transport stream with TSID=0x0031, it must tune to 506 MHz.

There are five possible service groups shown in FIG. 5. There is one service group associated with the modulator group 540. There is a second service group associated with the modulator group 550. There is a third service group associated with the combination of modulator group 540 and modulator group 550. There is a fourth service group associated with the modulator group 560. There is a fifth service group associated with the combination of modulator group 550 and modulator group 560.

A system controller, such as control system 44, is concerned with groups of HCTs and will therefor identify only three service groups. In FIG. 5, the first system controller identified service group, with service group identification (SGID)=0x0100, includes all HCTs receiving a signal from both the modulator group 540 and the modulator group 550 (e.g., HCT 501). The second system controller identified service group, SGID=0x0200, includes all HCTs receiving a signal from both the modulator group 550 and the modulator group 560 (e.g., HCT 502). The third system controller identified service group, SGID=0x1000, includes all HCTs receiving a signal only from the modulator group 550 (e.g., HCT 510).

Figure 6:
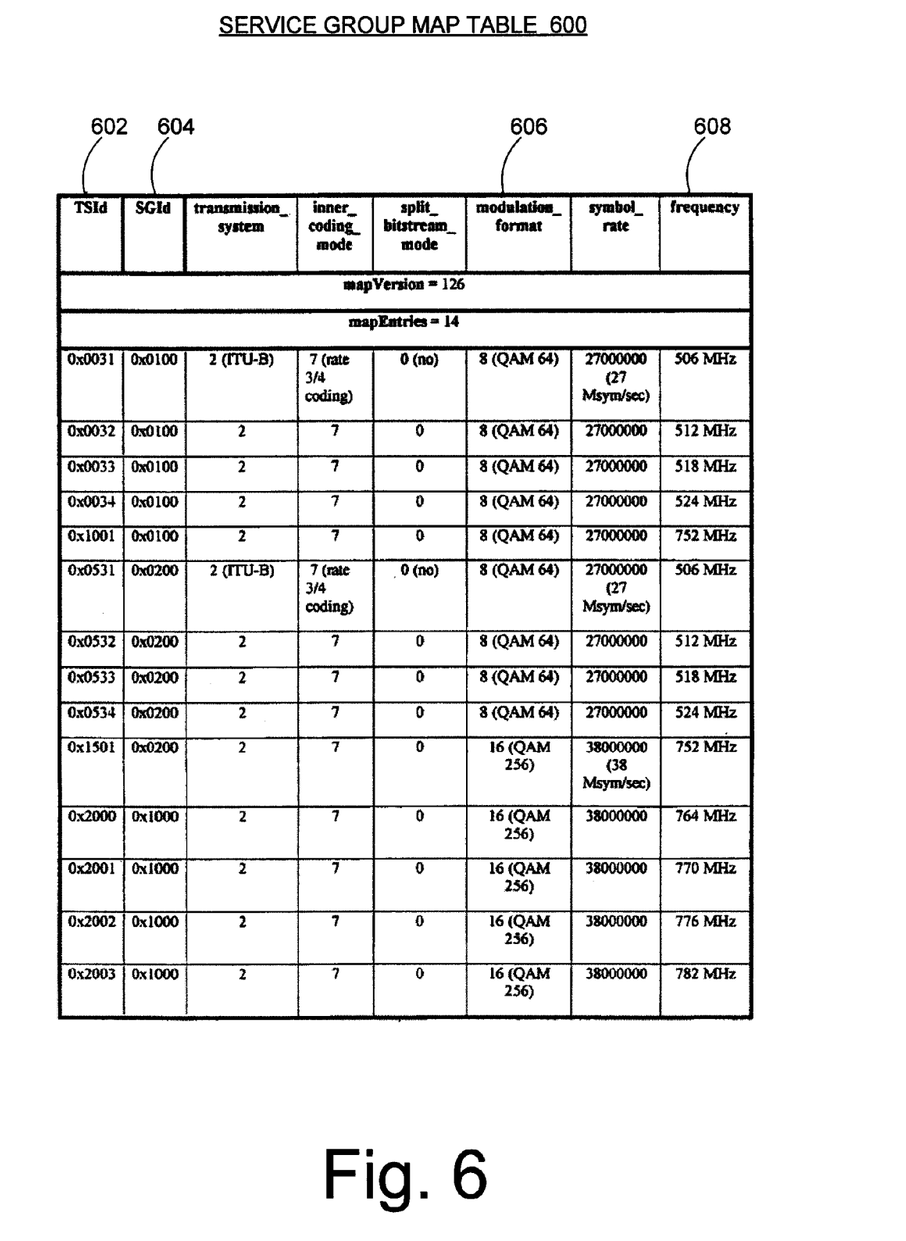
FIG. 6 illustrates a service group table.

FIG. 6 illustrates a service group map table. To allow the HCTs to identify their associated service group a service group map table 600 is sent from the system controller 44 (shown in FIG. 2) to the HCTs. The service group map table 600 includes a listing of TSIDs 602, SGIDs 604, modulation formats 606, and frequencies 608 an HCT uses to determine an associated service group. A frequency, such as 506 MHz, may be listed multiple times in the table since the subscriber television system may reuse frequencies for different purposes in different services groups. An HCT can retrieve the table and determine its service group based on the retrieved TSIDs (e.g., 0x0031 or 0x0531). TSID=0x0031 would indicate a SGID=0x0100 while TSID=0x0531 indicates SGID=0x0200. The modulation format 606 field allows for multiple types of modulators within the subscriber television system, such as 64 QAM and 256 QAM modulators.

Figure 7:
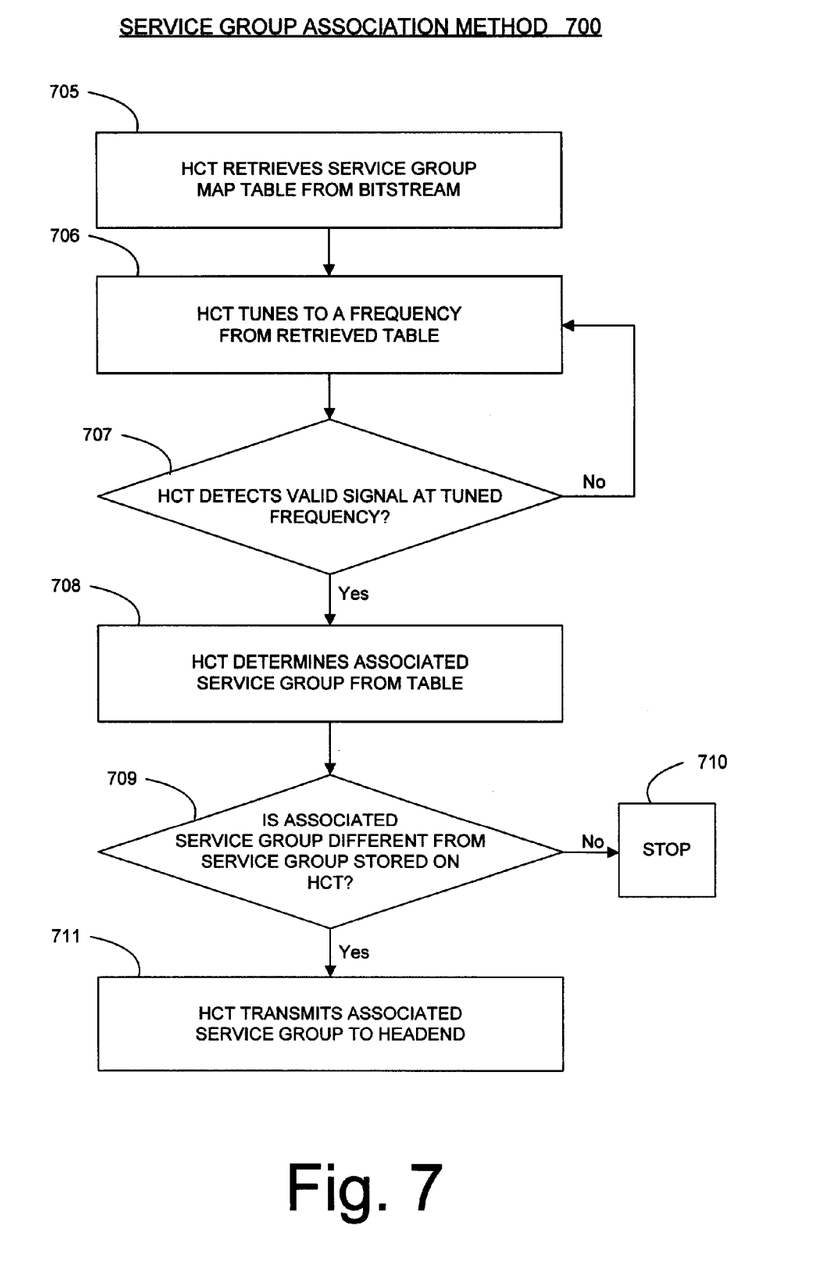
FIG. 7 is a flow diagram illustrating a method for dynamically determining the service group of an HCT.

FIG. 7 illustrates a method for dynamically determining the service group associated with an HCT. The HCT service group association method 700 can be programmed to occur at various times, such as during initialization of the HCT when first installed in a system, upon receiving a system command to check its service group, and periodically upon HCT activation (e.g., power on). To perform the service group association method 700, the HCT begins by retrieving a service group map table 600 from the appropriate MPEG transport stream (step 705).

Each frequency listed in the service group map table 600 is associated with a service group. The HCT tunes to a first frequency from the table 600 (step 706). The frequencies 608 are tuned in ascending order based on the assignment of the lowest frequencies to modulators in the lowest service group level (i.e., Level 0). This prevents the HCT from incorrectly determining its service group by tuning to a modulator associated frequency at a higher service group level before it checks for a lower level association. The HCT checks at the tuned frequency for a valid signal or MPEG bit stream (step 707). If there is a valid signal at the tuned frequency, the HCT, in step 708, will read the TSID 602 of the MPEG bit stream and find the associated service group 604 from the table 600 retrieved in step 705. If, in step 709, the associated service group 604 is determined to be the same service group association previously stored on the HCT, method 700 stops (step 710). If, in step 709, the associated service group 604 is determined to be different from the service group association previously stored on the HCT, the HCT will transmit the associated service group 604 to the system controller (step 711). If the HCT does not find a valid signal at the tuned frequency in step 707, the HCT tunes to the next frequency from the table 600 (step 706).

Based on the association of modulators, TSIDs, frequencies, and the HCTs shown in FIG. 5 and the service group table 600 shown in FIG. 6 the following further illustrates the method 700 of FIG. 7. HCTs 501, 502, and 510 would retrieve service group map table 600 from the appropriate transport stream (step 705) and tune to the lowest frequency of 506 MHz (step 706). HCTs 501 and 502 would find a valid signal (step 707). HCT 501 would retrieve associated TSID=0x0031 from the bit stream and use the service group table 600 to determine its service group as SGID=0x0100 (step 708). HCT 502, at the same frequency, would retrieve associated TSID=0x0531 from the bit stream and use the service group table 600 to determine its service group as SGID=0x0200. HCT 510 would repeat steps 706 and 707 for frequencies 506 MHz, 512 MHz, 518 MHz, 524 MHz, and 752 MHz. The frequencies 608 from table 600 include a mix of modulation formats 606. A subscriber television system network 100 may use different modulation formats depending on the placement of the modulators within the network. Typically, the 64 QAM modulation format would be associated with a location further from the headend in the network and therefor associated with a lower service group level. The two 752 MHz frequency listings in table 600 include one modulation format of 64 QAM and one of 256 QAM. The HCT would first try to tune to this frequency using the 64 QAM modulation format parameters. If it was unable to lock onto a QAM carrier, the HCT would then try to tune to 752 MHz using the 256 QAM modulation format parameters. Eventually HCT 510 finds a valid signal at 764 MHz with a 256 QAM modulation format. HCT 510 would then retrieve associated TSID=0x2000 from the bit stream and using the service group table 600 determine its service group as SGID=0x1000. In response to a request for service group association or if the associated service group was different then a previously stored service group association, the HCTs 501, 502, and 510 would transmit their respective service group associations to the control system 44 (shown in FIG. 2) of the subscriber television network (step 711).

The control system 44 (shown in FIG. 2) of the subscriber television network maintains a database of the service group associated with each HCT. From this database the control system 44 can determine what services and programming are available on a particular HCT. The service group association method 700 allows the dynamic updating of a database to keep it current as to the services and programming available to the HCTs.

The subscriber television system layout remains fairly static and is only occasionally reconfigured or changed with the addition, replacement, or removal of components. When the system layout changes the service group assignments and levels can also change. The system controller maintains a service group database of the relationships of the service groups to the various components within the system, such as modulators, combiners, servers, and nodes. To keep the database current the system controller will perform a service group audit. This occurs periodically and upon layout or configuration changes.

Figure 8:
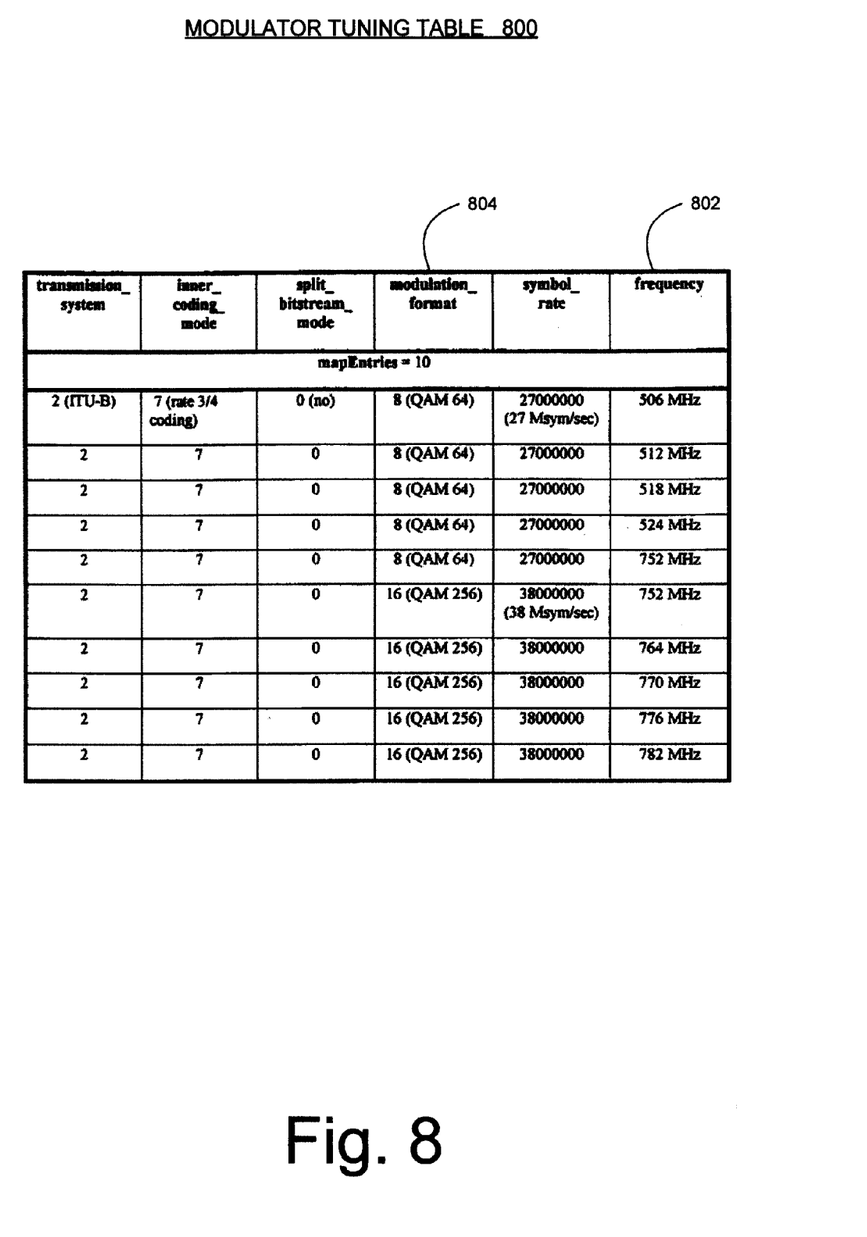
FIG. 8 illustrates a modulator tuning table.

A modulator tuning table 800 associated with the service group audit is maintained by the system controller. FIG. 8 illustrates a modulator tuning table. The modulator tuning table 800 would be sent in the transport streams to HCTs that will be involved in the audit. The modulator tuning table 800 includes a complete listing of frequencies 802 and modulation formats 804 available in the subscriber television system. The modulation format 804 field allows for multiple types of modulation formats at the same frequency, such as 64 QAM and 256 QAM modulation at 752 MHz.

When a modulator is physically installed in the subscriber television system, it is connected to a combiner, such as combiner 46 (shown in FIG. 2). The location of the combiners in the network are associated with the service group assignments and levels. In order to maintain a service group database, the system controller queries various network components to discover their location in the network and their relationships to other components. Because the combiner 46 is typically a passive device, the system controller cannot directly query it to determine which modulators the combiner 46 combines to provide services to a particular service group. Consequently, a designated HCT associated with a service group is required to periodically execute a service group audit to provide the information. In a service group audit, the designated HCT tunes to every frequency available in the subscriber television system. Since this procedure is performed whenever the modulators are changed, it is often desirable to install dedicated HCTs in the system for the sole purpose of providing audit information. Optionally a subscriber HCT or other equipment can be a designated audit device. The system operator defines the service groups and designates a device to audit that service group. A device that is designated to audit a service group must be connected to a point beyond a service group combiner but before any other combiners. That is, all system input to the audit device must come directly from the output of the combiner that it is designated to audit.

Figure 9:
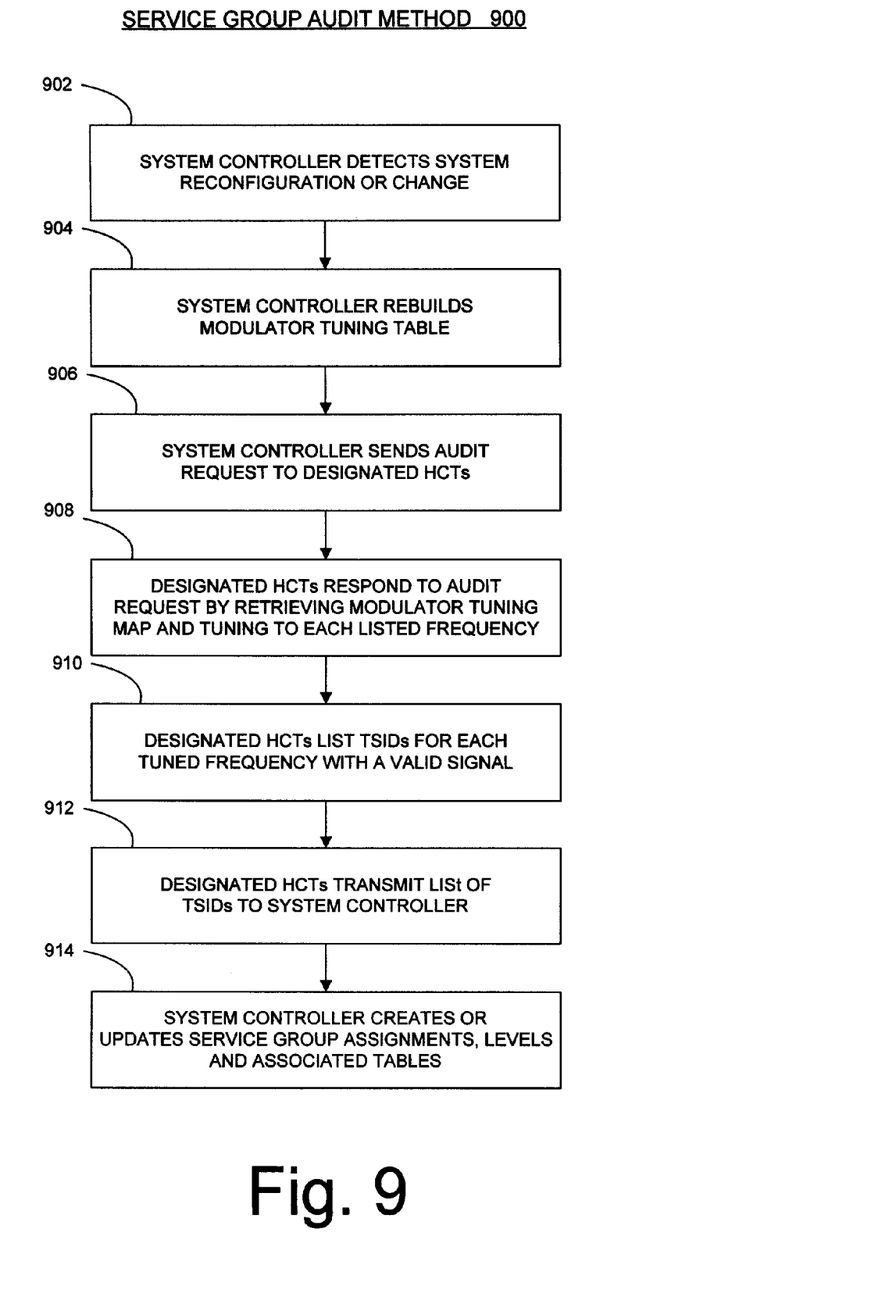
FIG. 9 is a flow diagram illustrating a method for the discovery and establishment of service groups within a subscriber television system.

FIG. 9 illustrates a method for the discovery and establishment of service groups within a subscriber television system through the use of service group audits. The method 900 begins at step 902 when the system controller detects that the modulator configuration has been modified. The method then proceeds to step 902 where the system controller rebuilds the modulator tuning table 800 that contains the tuning information for all modulators in the system. The system controller then sends an audit request to each of the designated service group audit HCTs (step 906). This request causes these HCTs to perform a service group audit. Each of the designated HCTs retrieves the modulator tuning table from the bit stream and attempts to tune every listed modulator frequency (step 908). When a valid modulator signal is found, the HCT records its TSID (step 910). When the entire list of frequencies has been attempted, the HCT sends a list of the TSIDs that it found to the system controller (step 912). The system controller uses this report to document the topology of TSIDs and service groups and to maintain the database of those associations (step 914). The information on the relationships between the components of a subscriber television system and the service groups and service group levels may be contained within a single database or within multiple databases.

The service group audit method 900, in conjunction with system operator input, is used during the initialization of a system to establish the service groups and service group levels. The periodic updating of the modulator tuning table 800 and the various databases ensure that the table and databases accurately reflect the current configuration of the subscriber television system. System controller auditing provides an updating to service group association and levels whenever any component changes or any portion of or all of the system is reconfigured.

CONCLUSION

From the foregoing, it will be appreciated that the present invention is directed to a method, apparatus, and system that allows the easy and dynamic identification of the services and programming available to an HCT within a subscriber television system. The HCT determines and informs the subscriber television system of the service group that it belongs to. The present invention is also directed to a method and apparatus for establishing service groups and service group associations within a subscriber television system using service group audits. The service group audit is used to define and update the service groups of the digital subscriber television system.

The present invention has been described in relation to particular embodiments, which are intended in all respects to be illustrative rather than restrictive. For example, there are methods known to those skilled in the art of designing subscriber television systems of using other modulation and routing schemes for both in-band and out-of-band communications and data transmission other than a QAM and QPSK combination. There are system designs that use only QAM modulation and that utilize other communication routing methods. The service group associations of the present invention are not limited to a particular modulation scheme.

Those skilled in the art will appreciate that although the present invention has been described in the context of tuning frequencies in an ascending order from a lowest frequency, other methods may be employed that match the method used to assign frequencies to modulators based on service group levels.

The foregoing description includes a decoder 110, typically an HCT. Those skilled in the art will recognize that the functionality of the HCT associated with the present invention can be consolidated to single card that can be located in any of a number of devices, such as a TV, computer, or even a portable device. The portable device could be used in conjunction with any of the other devices. In addition, those skilled in the art will recognize that the functionality associated with creating tables, retrieving tables from a transport stream, tuning to a frequency, transmitting and receiving messages within a subscriber television system, and establishing, updating, and maintaining databases can be achieved by a variety of methods well known in the related arts. Specifically, the present invention is not so limited and can be employed to determine a service group association of any equipment capable of two-way communication and receiving services and programming within a subscriber television system.

In conclusion, while exemplary embodiments of the invention have been illustrated and described, it will be clear that the invention is not so limited. Alternative embodiments will be apparent to those skilled in the art to which the present invention pertains without departing from its spirit or scope. Accordingly the appended claims rather than the foregoing description define the scope of the present invention.

What is claimed is:

1. A method, at a decoder in a subscriber television system, for determining a service group associated with the decoder, the method comprising the steps of:
   (a) retrieving a service group table from a signal on the transmission medium, wherein the service group table includes a plurality of service group identifications, a plurality of transport stream identifications, and tuning information associated with at least one transport stream identification;
   (b) retrieving at least a portion of the tuning information from the service group table, the tuning information including at least one frequency, wherein the at least one frequency is associated with the at least one transport stream identification;
   (c) tuning to a frequency retrieved from the tuning information;
   (d) determining if a valid signal is present at the tuned frequency;
   (e) in response to determining that a valid signal is detected at the tuned frequency, determining the transport stream identification associated with the tuned frequency and, from the determined transport stream identification, determining an associated service group from the service group table as the service group for the decoder;
   (f) comparing the determined service group for the decoder with a previously stored service group; and
   (g) in response to a determination that the determined service group for the decoder is different than the previously stored service group, uploading the determined service group for the decoder to a system controller at a headend.

2. The method of claim 1, further comprising in response to determining that a valid signal is not detected at the tuned frequency, repeating steps (c)-(e) for the remaining frequencies in the service group table until a valid signal is detected.

3. The method of claim 1, further comprising storing the determined service group on the decoder.

4. The method of claim 1, wherein the step of determining whether a valid signal is present on the tuned frequency comprises determining whether the tuned frequency includes an MPEG transport stream.

5. The method of claim 1, wherein the decoder is a home communications terminal, a television, or a computer.

6. A method for determining a service group association of at least one decoder, comprising the steps of:
   creating, at a headend, a service group table for a subscriber television system, wherein the service group table includes a plurality of service group identifications, a plurality of transport stream identifications, and tuning information associated with at least one transport stream identification;
   causing to be transmitted, from the headend, the service group table via the transmission medium to the at least one decoder;
   receiving a message, at the headend, from the least one decoder, the message including the service group associated with the at least one decoder; and
   recording, at the headend, the relationship of the at least one decoder to the associated service group.

7. The method of claim 6, wherein the service group table is in a Moving Picture Experts Group table format.

8. The method of claim 6, wherein the at least one decoder includes at least one of the following: a home communications terminal, a television, and a computer.

9. A system controller for causing to be stored and updated a database of a service group association for each of a plurality of decoders of a subscriber television system, the system controller comprising:

means for causing to be stored, in the database, the service group association for each of the plurality of decoders;

means for causing the creation of a service group table for the subscriber television system, wherein the service group table includes a plurality of service group identifications, a plurality of transport stream identifications, and tuning information associated with at least one transport stream identification for determining a service group to which a decoder in the plurality of decoders belongs;

means for causing a headend to transmit the service group table to at least one of the plurality of decoders via a transmission medium;

means for receiving a message from the at least one of the plurality of decoders, the message including the service group associated with at least one of the plurality of decoders; and     means for causing the updating of the database responsive to the service group associated with the at least one of the plurality of decoders being different from a stored service group association for the at least one of the plurality of decoders and for causing to be stored the updated database.

10. The system controller of claim 9, wherein the plurality of decoders includes at least one of the following: home communications terminals, televisions, and computers.

11. A system controller for determining service group associations of a plurality of modulators in a subscriber television system, the system controller comprising:

means for storing and updating a database of tuning frequencies, related transport stream identities, and associated service group identities for each of the plurality of modulators;

means for causing the creation of a modulator tuning table for the subscriber television system, the modulator tuning table including the tuning frequencies related to each of the plurality of modulators;

means for causing to be transmitted, from the headend, the modulator tuning table via the transmission medium to at least one of a set of audit designated decoders;

means for receiving a message from at least one of the set of audit designated decoders, the message including the related transport stream identities determined by the at least one of the set of audit designated decoders based on tuning the frequencies related to each of the plurality of modulators, locating a valid transport stream related to the tuned frequency, and retrieving a related transport stream identification from the transport stream; and     means for causing the updating of the database, responsive to the related transport stream identities being associated with the at least one of the set of audit designated decoders.

12. The system controller of claim 11, wherein at least one of the set of audit designated decoders is further configured to operate as a general purpose decoder.

13. The system controller of claim 11, wherein at least one of the audit designated decoders are configured as at least one of the following: a home communications terminal, a television, and a computer.

14. A method of using at least one of a set of audit designated decoders at specific locations within a subscriber television system to define a service group, comprising the steps of:

establishing, at a headend, a modulator tuning table listing a plurality of available subscriber television system frequencies associated with a plurality of modulators;

transmitting the modulator tuning table from the headend to at least one of the set of audit designated decoders;

retrieving the modulator tuning table at the at least one of the set of audit designated decoders;

tuning, at the at least one of the set of audit designated decoders, to each frequency listed in the modulator tuning table and, if a valid signal is detected at a tuned frequency, retrieving an associated Motion Picture Experts Group (MPEG) transport stream identity for the tuned frequency;

transmitting to the headend, by the at least one of the set of audit designated decoders, the retrieved associated transport stream identity for the tuned frequency associated with the at least one of the set of audit designated decoders; and     defining, as the service group, a subset of modulators associated with the transport stream identity of the tuned frequency with a valid signal of the at least one of the set of audit designated decoders and associated with the specific location of the at least one of the set of audit designated decoders.

15. The method of claim 14, wherein at least one of the set of audit designated decoders includes at least one of the following: a home communications terminal, a television, and a computer.

16. The method of claim 14, further including the step of defining all the service groups of the subscriber television system based on the subset of modulators associated with the transport stream identities of the tuned frequencies with a valid signal and associated specific location of each of the set of audit designated decoders.

17. The method of claim 14, wherein at least one of the set of audit designated decoders is configured to operate as a general purpose decoder.

* * * * *